United States Patent
Saito et al.

(10) Patent No.: US 7,092,238 B2
(45) Date of Patent: Aug. 15, 2006

(54) METALLIZED FILM CAPACITOR

(75) Inventors: Toshiharu Saito, Toyama (JP); Kohei Shiota, Hyogo (JP); Hiroki Takeoka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/536,348

(22) PCT Filed: Dec. 3, 2003

(86) PCT No.: PCT/JP03/15465

§ 371 (c)(1),
(2), (4) Date: May 26, 2005

(87) PCT Pub. No.: WO2004/053902

PCT Pub. Date: Jun. 24, 2004

(65) Prior Publication Data

US 2005/0263845 A1    Dec. 1, 2005

(30) Foreign Application Priority Data

Jun. 12, 2002   (JP) .............................. 2002-355138

(51) Int. Cl.
   *H01G 4/32*   (2006.01)
   *H01G 4/08*   (2006.01)
(52) U.S. Cl. ............... 361/329; 361/301.5; 361/323
(58) Field of Classification Search .. 361/308.1–308.6, 361/301.4, 301.5, 306.1, 306.2, 309, 311, 361/323–330
See application file for complete search history.

(56) References Cited

U.S. PATENT DOCUMENTS 3,483,453 A * 12/1969 Meyers ....................... 361/330
6,757,151 B1 * 6/2004 Eriksson et al. ............. 361/273

FOREIGN PATENT DOCUMENTS

| EP | 635857 A1 * | 1/1995 |
| JP | 50-043241 | 5/1975 |
| JP | 54-084255 | 7/1979 |
| JP | 55-173131 | 12/1980 |
| JP | 56-078422 | 6/1981 |
| JP | 08-250382 | 9/1996 |
| JP | 11-144995 | 5/1999 |
| JP | 2000-012383 | 1/2000 |
| JP | 2000-150299 | 5/2000 |
| JP | 2003-133172 | 5/2003 |

* cited by examiner

*Primary Examiner*—Eric W. Thomas
(74) *Attorney, Agent, or Firm*—McDermott Will & Emery LLP

(57) ABSTRACT

The present invention is to provide a metallized film capacitor having a compact size, a large capacitance and a low inductance whereas number of parts is reduced. The metallized film capacitor comprises: a plurality of capacitor elements (1) provided with metallized contact electrodes (2) on both ends in the width direction; a bus-bar (3) to connect each of a plurality of electrodes (2) on one end; and a capacitor case (5) to house a plurality of capacitor elements (1), wherein a plurality of capacitor elements (1) are arranged in the capacitor case such that one side of electrodes (2) faces the opening surface of capacitor case (1) and each electrode (2) of one of both ends of each capacitor element (1) are positioned generally coplanarly.

10 Claims, 6 Drawing Sheets

METALLIZED FILM CAPACITOR

This application is a U.S. National Phase Application of PCT/JP2003/015465.

1. Technical Field

The present invention relates to a metallized film capacitor used for electronic, electrical and industrial equipment, vehicles or the like and particularly to a smoothing capacitor for use in an inverter circuit for motor starting installed in hybrid vehicles or the like.

2. Background Art

The metallized film capacitor, although having a disadvantage of large volume compared with the aluminum electrolytic capacitor of an equivalent amount of capacitance, has excellent properties of low losses, high withstand voltage, low temperature and frequency dependency or the like. Particularly the film capacitor can work well under high voltages of DC 500 V or higher if the film thickness is controlled suitably due to a high withstand voltage of the dielectric film.

Contrarily the aluminum electrolytic capacitor is difficult for use on DC 500 V or higher due to restrictions of the withstand voltage of the dielectric oxide film. To use the aluminum electrolytic capacitor for a high voltage application, therefore, a plurality of aluminum electrolytic capacitors must be connected in series to share the voltage applied.

In addition to this, the aluminum electrolytic capacitors connected in series need in operation to connect a resistor in parallel with the capacitors to maintain the voltage applied on each resistor to a certain value. The metallized film capacitor has been widely used for high voltage of DC 500 V or higher, even in a case of DC circuit, because the aluminum electrolytic capacitor is difficult to use on a high voltage application as mentioned above.

Such conventional technologies are disclosed for instance in Japanese Patent Laid-Open Application No. H08-31690 and 2001-76967. The metallized film capacitor is used for various purposes such as filtering in DC circuits, smoothing in inverter circuits or the like. A plurality of capacitors connected in parallel is generally used to increase the capacitance if a single capacitor element itself cannot provide enough capacitance.

However, a plurality of single metallized film capacitors connected in parallel occupies a large space. Additional problem is that many bus-bars are necessary for connection, causing an increase in product cost.

Another problem is that electrical connection using many bus-bars causes a long wiring length, resulting in a large total inductance.

A method to include a plurality of capacitor elements connected in parallel in a case has been disclosed, but any method to maximize the arrangement of the capacitor elements in the case is not yet disclosed.

Moreover, in a hot and humid environment possible in a hybrid car or the like, moisture gradually enters during operation from a resin surface of the case opening. This will cause eventually a deterioration of evaporated metals on the film and will decrease the capacitance greatly with time.

To solve the problems mentioned above, the present invention aims at providing a metallized film capacitor with a compact size, a large capacitance, a low inductance and a reduced number of parts.

DISCLOSURE OF THE INVENTION

The present invention is to provide a metallized film capacitor comprising: a plurality of capacitor elements composed of rolled up or multi-layered metallized films and provided with electrodes on both ends in the width direction; a bus-bar to connect each electrode of a plurality of the capacitor elements; and a capacitor case (case) to include a plurality of the capacitor elements, wherein a plurality of the capacitor elements are arranged to face a same direction in the case, placing each electrode of both ends generally coplanarly.

Additionally, a metallized film capacitor comprising: a plurality of capacitor elements composed of rolled up or multi-layered metallized films and provided with electrodes on both ends in the width direction; an electric conductor to connect each electrode of a plurality of the capacitor elements; and a case to include a plurality of the capacitor elements, wherein the capacitor case houses a plurality of the capacitor elements having different widths of the metallized film and each electrode of each capacitor elements is connected in parallel so as to sandwiched between two pieces of bent electrical conductors.

DETAILED DESCRIPTIONS OF THE INVENTION

The exemplary embodiments in the present invention are described with reference to drawings. The drawings do show schematically only positions of elements and do not show dimensions correctly.

EXEMPLARY EMBODIMENT 1

Figure 2:
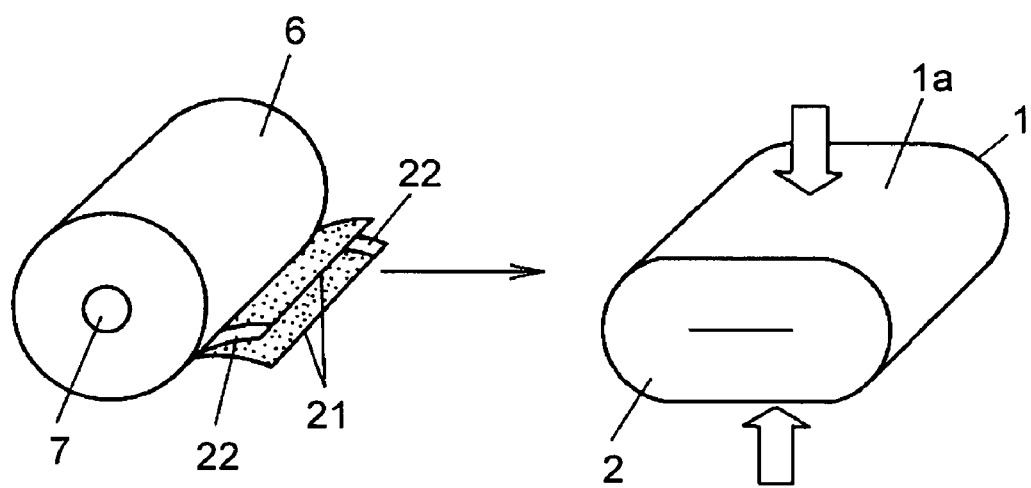
FIG. 2 shows a manufacturing process of the flattened capacitor element used in exemplary embodiment 1 of the present invention.

Capacitor 1 is formed of two sheets of metallized film 21, evaporated on one side, rolled up and flattened using a polypropylene film as the dielectric as shown in FIG. 2. Metallized film 21 of capacitor 1 is provided with metallized contact electrodes formed by zinc spraying on both ends in the width direction. A pair of elongated copper bus-bars 3, electrical conductors, connect each metallized contact electrode 2 of a plurality of capacitors 1 on both ends. Bending the ends of bus-bars 3 provides electrode terminals 4 for external connection. That is, electrode terminals 4 are integrated with bus-bars 3.

Figure 1:
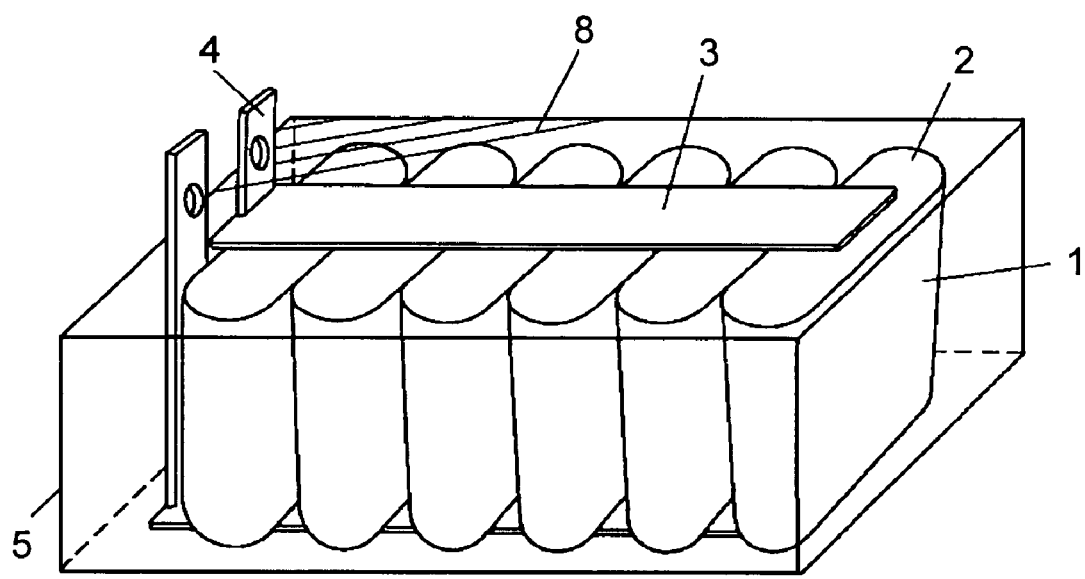
FIG. 1 shows a perspective view of the metallized film capacitor used in exemplary embodiment 1 of the present invention.

Capacitor case (case) 5 is formed from polyphenylenesulfide (PPS). Instead of plastics such as PPS or polybutylene terephthalate (PBT), metals such as aluminum can be available for the case material. A plurality of capacitors 1 are aligned in case 5, appressed against flattened surfaces 1a toward a same direction, as shown in FIG. 1. Being positioned each metallized contact electrode of a plurality of capacitors 1 on each of both ends generally coplanarly, one side faces the opening surface and the other side faces the bottom surface of case 5. A pair of bus-bars 3 connect each metallized contact electrode 2 of capacitors 1 facing the opening surface and facing the bottom surface of case 5. Empty spaces of case 5 thus including a plurality of capacitor elements 1 and a pair of bus-bars 3 are filled with epoxy resin 8 as a sealant (shown partially by hatching in FIG. 1). The configuration can improve reliabilities of the capacitor such as moisture resistance or the like. The electrostatic capacitance (capacitance) of the metallized film capacitor shown in FIG. 1 that includes 6 flattened capacitor elements 1 connected in parallel by using a pair of bus-bars 3 is the sum of capacitance of 6 capacitor elements 1. A single capacitor element 1 has an amount of capacitance of 70 μF, resulting in an amount of capacitance of 420 μF totally.

Metallized contact electrodes 2 of respective capacitor elements 1 are positioned coplanarly and are connected to bus-bars 3 in the level by soldering. One of metallized contact electrodes 2 faces the opening surface, and the other the bottom surface of case 5.

Case 5 is 105 mm wide, 60 mm long, and 60 mm high, and bus-bar 3 is 1 mm thick.

Electrode terminal 4 protrudes externally by 30 mm from the surface of filled epoxy resin 8 of case 5.

Next, the manufacturing method of flattened capacitor element 1 for the metallized film capacitor in exemplary embodiment 1 is described with reference to FIG. 2. To make flattened capacitor element 1, firstly two sheets of metallized film 21 consisting of polypropylene film of 3.2 μm thick, aluminum evaporated on one side, are rolled up around roll core 7 (core diameter of 20 mm) to form a cylindrical convolute body 6.

The present invention does not so limit the core diameter of 20 mm as adopted in exemplary embodiment 1. The core diameter should preferably be large with respect to the size of case 5 to increase the flattening ratio of the capacitor element. The capacitor element thus formed can utilize the space of case more efficiently as many capacitor elements can be aligned in case 5, appressed against flattened surfaces 1a toward a same direction.

Next, roll core 7 is removed from the cylindrical convolute body 6 of metallized films. Pressing vertically the cylindrical convolute body 6 forms a flattened convolute body 6, and subsequently zinc thermal spraying can provide both ends of the flattened convolute body 6 with metallized contact electrodes 2 to complete flattened capacitor element 1. The flattened form of the element can utilize the space of case 5 more efficiently. The two sheets of metallized film 21 with aluminum evaporated on one surface to produce capacitor element 1 is provided on one edge in the width direction with narrow margins 22 free of the evaporated film, as is well known in the conventional metallized capacitors. By rolling convolutedly in two metallized films in the direction such that margin 22 does not meet each other, the metallized film capacitor can be provided with metallized contact electrodes 2 extended from each of both ends. The present invention does not so limit the dielectric film, kinds of the evaporated metal, materials of the bus-bars, and materials of capacitor case (case) to such as adopted in exemplary embodiment 1. PBT or PPS may be agreeable for dielectric films. Zinc, an aluminum-zinc alloy or the like may be acceptable for use in the metalization. Copper, copper plated parts, aluminum or the like can be used for the bus-bar.

Table 1 lists capacitance per unit volume (μF/cm$^3$), inductance (nH) and rate-of-change of capacitance (%) of the metallized film capacitor used in exemplary embodiment 1 of the present invention. Where, the rate-of-change of capacitance is a ratio of change in capacitance, after loading DC 600 V for 2000 hours continuously in an ambient of a temperature of 85° C. and a relative humidity of 85%, to an initial capacitance expressed in percentage.

EXEMPLARY EMBODIMENT 2

The metallized film capacitor used in exemplary embodiment 2 is mainly described on the points different from exemplary embodiment 1, as the basic configuration and functional effects of the metallized film capacitor are similar to those of exemplary embodiment 1, therefore similar elements have the same reference marks and detailed descriptions are omitted.

Figure 3A:
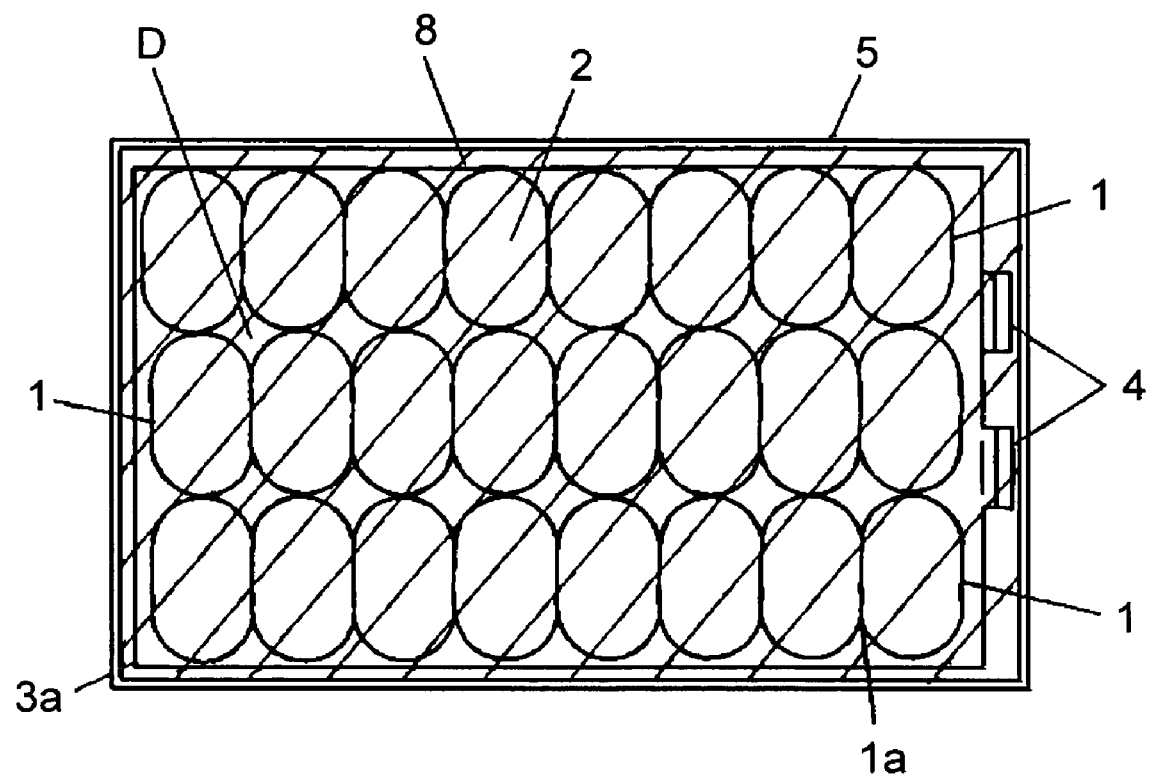
FIG. 3A shows a top view of the metallized film capacitor used in exemplary embodiment 2 of the present invention.
Figure 3B:
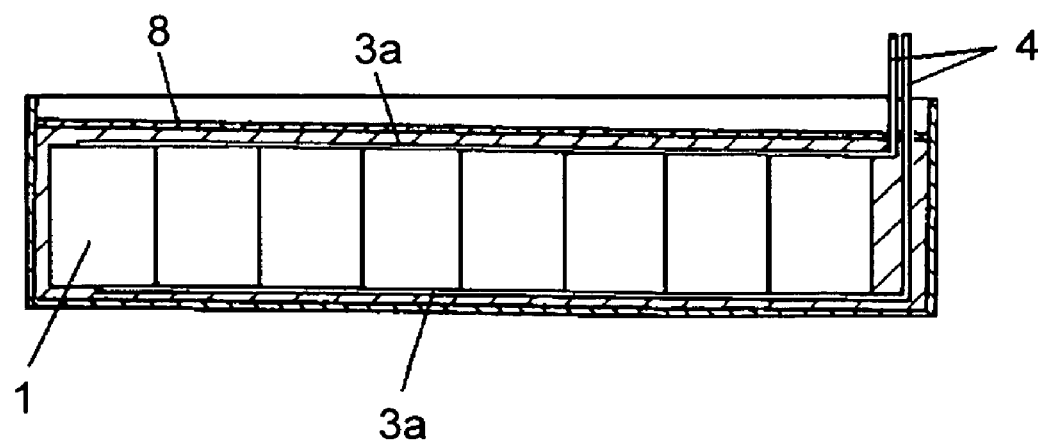
FIG. 3B shows a sectional side view of the metallized film capacitor used in exemplary embodiment 2 of the present invention.

The size of case 5 is 160 mm wide, 120 mm long, and 75 mm high, and bus-bar 3a to connect metallized contact electrodes 2 has a plate-like size so as to cover the opening of case 5 as shown in FIGS. 3A and 3B. Moreover, case 5 is designed to include 24 pieces of capacitor elements 1 in case 5 by changing rolling numbers of metallized films 21 and the diameter of roll core 7. Twenty-four pieces of capacitor elements 1 are housed in case 5 arranged in a plurality of lines along with a certain direction. The single flattened capacitor element 1 has a capacitance of 58.3 μF, resulting a large amount of capacitance of 1400 μF in the capacitor totally. Table 1 lists capacitance per unit volume (μF/cm$^3$), inductance (nH) and rate-of-change of capacitance (%) of the metallized film capacitor used in exemplary embodiment 2 of the present invention. The definition of the rate-of-change of capacitance is the same as for exemplary embodiment 1.

EXEMPLARY EMBODIMENT 3

The metallized film capacitor used in exemplary embodiment 3 is mainly described on the points different from exemplary embodiment 1, as the basic configuration and functional effects of the metallized film capacitor are similar to those of exemplary embodiment 1, therefore similar elements have the same reference marks and detailed descriptions are omitted.

Figure 4A:
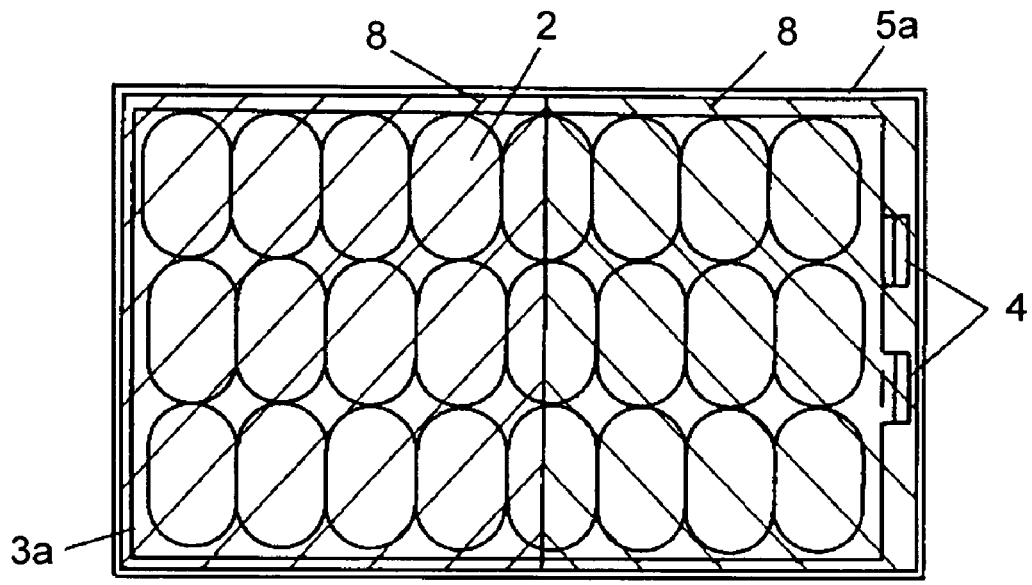
FIG. 4A shows a top view of the metallized film capacitor used in exemplary embodiment 3 of the present invention.
Figure 4B:
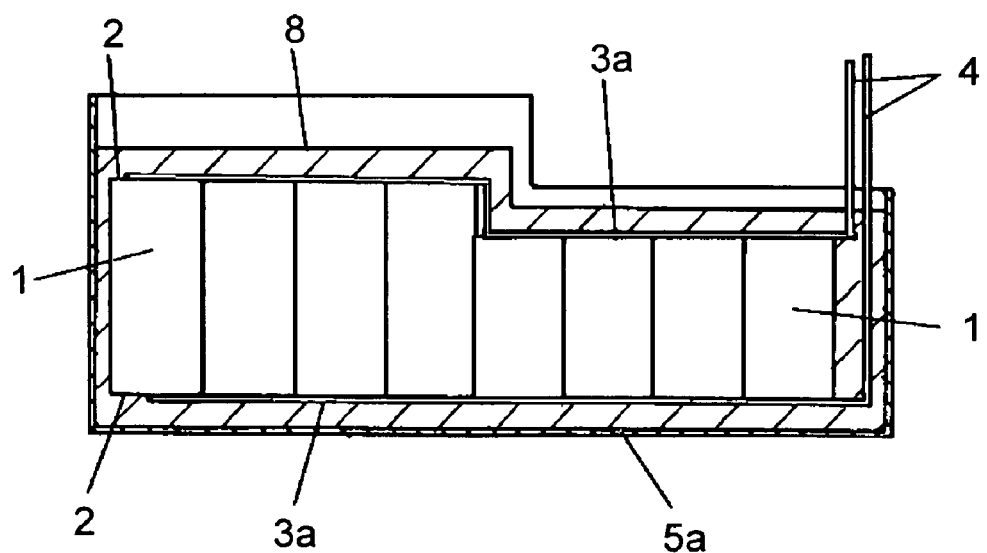
FIG. 4B shows a sectional side view of the metallized film capacitor used in exemplary embodiment 3 of the present invention.

Exemplary embodiment 3 employs capacitor case (case) 1a having taller side surface in left-hand half than in right-hand half, an uneven side view, as shown in FIG. 4B that is a modification of the case used in exemplary embodiment 2.

The flattened capacitor element 1 has two kinds of capacitor element having different widths of the metallized film. The taller left-hand half of case 5a houses taller capacitor elements 1 formed of wider metallized films 21. The lower right-hand half of case 5a houses lower capacitor elements 1 formed of narrower metallized films 21. Every capacitor element 1 is housed in case 5a, putting one of metallized contact electrodes 2 on the bottom surface coplanarly. The flattened capacitor elements 1 thus housed cause a difference in height in both sides of the centerline of the opening of case 5a accordingly.

Additionally, bus-bars 3a located in the opening side of case 5a to connect metallized contact electrodes 2 are bent in the center to connect metallized contact electrode of every capacitor element 1 in parallel as shown in FIG. 4B.

The volume of case 5s of exemplary embodiment 3 is the sum of two rectangular solids of:
80 mm wide, 120 mm long, and 75 mm high, and
80 mm wide, 120 mm long, and 100 mm high.
This amounts to 1680 cm$^3$ totally.

The single flattened capacitor element 1 has a capacitance of 58.3 µF for narrow type and 78 µF for wide type respectively, resulting in a large amount of capacitance of 1635 µF in the metallized film capacitor totally. Table 1 lists capacitance per unit volume (µF/cm$^3$), inductance (nH) and rate-of-change of capacitance (%) of the metallized film capacitor used in exemplary embodiment 3 of the present invention. The definition of the rate-of-change of capacitance is the same as for exemplary embodiment 1.

EXEMPLARY EMBODIMENT 4

The metallized film capacitor used in exemplary embodiment 4 is mainly described on the points different from exemplary embodiment 1 and 2, as the basic configuration and functional effects of the metallized film capacitor are similar to those of exemplary embodiment 1 and 2, therefore similar elements have the same reference marks and detailed descriptions are omitted.

Figure 5A:
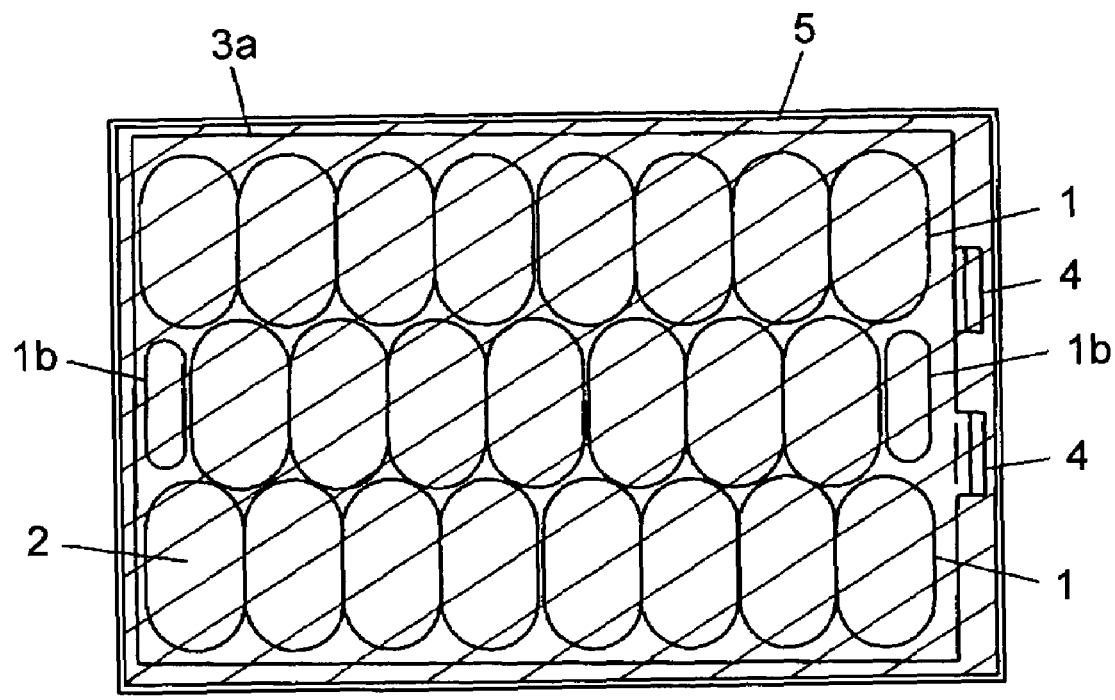
FIG. 5A shows a top view of the metallized film capacitor used in exemplary embodiment 4 of the present invention.
Figure 5B:
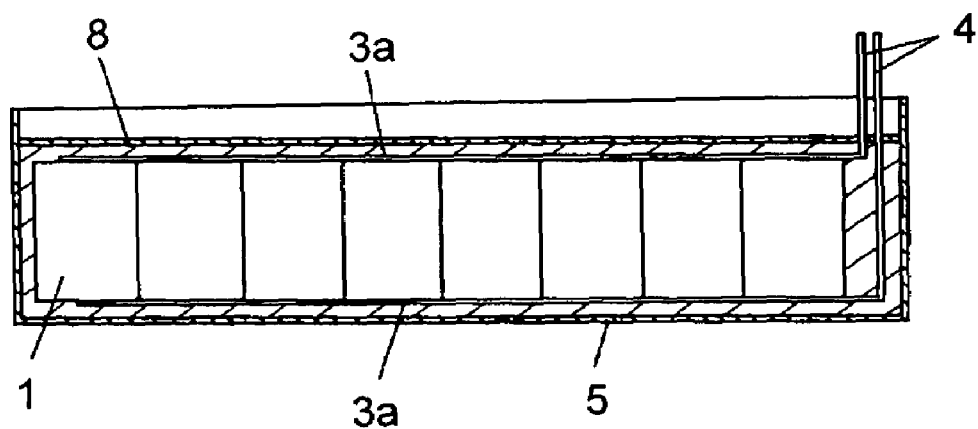
FIG. 5B shows a sectional side view of the metallized film capacitor used in exemplary embodiment 4 of the present invention.

In exemplary embodiment 2, eight pieces of the flattened capacitor element 1 are aligned in a same positioning in all of the three lines. Contrarily, the flattened capacitor elements 1 are arranged in a zigzag formation to reduce dead spaces as much as possible in exemplary embodiment 4 as shown in FIG. 5A. The central line consists of seven pieces of capacitor elements 1 having an amount of capacitance equivalent to the other sides and additional two pieces of capacitor elements 1b having an amount of one half of the capacitance. The abovementioned arrangement of capacitor elements 1 and 1b will be able to utilize dead spaces D in FIG. 3A efficiently. The configuration can increase the amount of capacitance per each capacitor element 1 by 7%, and consequently can provide the metallized film capacitor with 1500 µF. Table 1 lists capacitance per unit volume (µF/cm$^3$), inductance (nH) and rate-of-change of capacitance (%) of the metallized film capacitor used in exemplary embodiment 4. The definition of the rate-of-change of capacitance is the same as for exemplary embodiment 1.

EXEMPLARY EMBODIMENT 5

The metallized film capacitor used in exemplary embodiment 5 is mainly described on the points different from exemplary embodiment 1 to 4: using of multi-layered capacitor elements. The basic configuration and functional effects of the metallized film capacitor are similar to those of exemplary embodiment 1 to 4, therefore similar elements have the same reference marks and detailed descriptions are omitted.

Figure 6A:
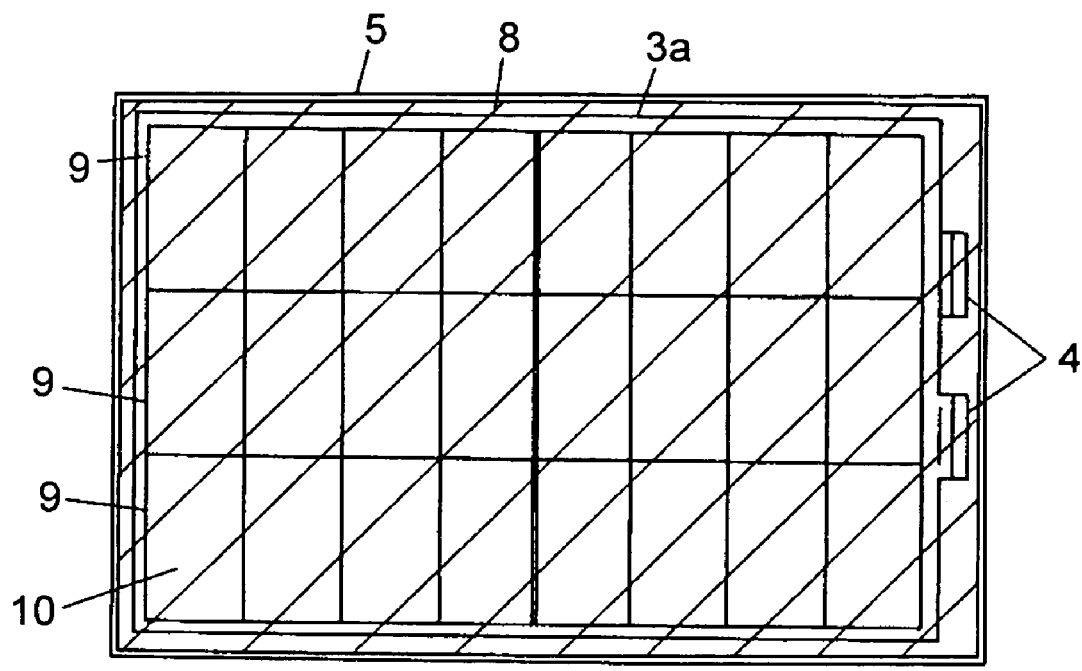
FIG. 6A shows a top view of the metallized film capacitor used in exemplary embodiment 5 of the present invention.
Figure 6B:
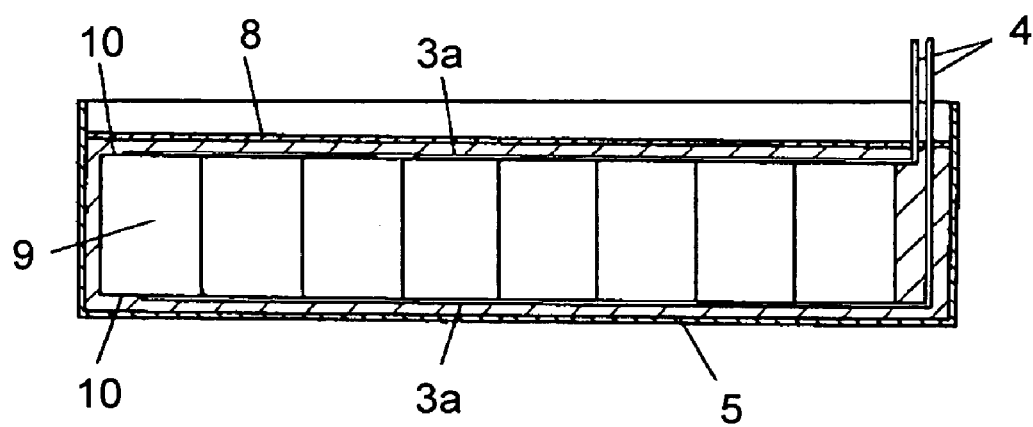
FIG. 6B shows a sectional side view of the metallized film capacitor used in exemplary embodiment 5 of the present invention.

Multi-layered capacitor element 9 shown in FIGS. 6A and 6B replaces flattened capacitor elements 1 used in exemplary embodiments 1 to 4.

Multi-layered capacitor element 9 can be produced by cutting to remove corner (curved) portions of flattened capacitor element 1, used in exemplary embodiments 1 to 4, perpendicularly to metallized contact electrode 10.

Irradiations of YAG laser can remove evaporated metals on the cut surfaces and can apply a withstand voltage in the cut surfaces. Use of such multi-layered capacitor elements can reduce the dead spaces in capacitor case (case) 5 drastically. The capacitance of the metallized film capacitor amounts to 1860 µF.

Table 1 lists capacitance per unit volume (µF/cm$^3$), inductance (nH) and rate-of-change of capacitance (%) of the metallized film capacitor used in exemplary embodiment 5. The definition of the rate-of-change of capacitance is the same as for exemplary embodiment 1.

COMPARATIVE EXAMPLE

Figure 7A:
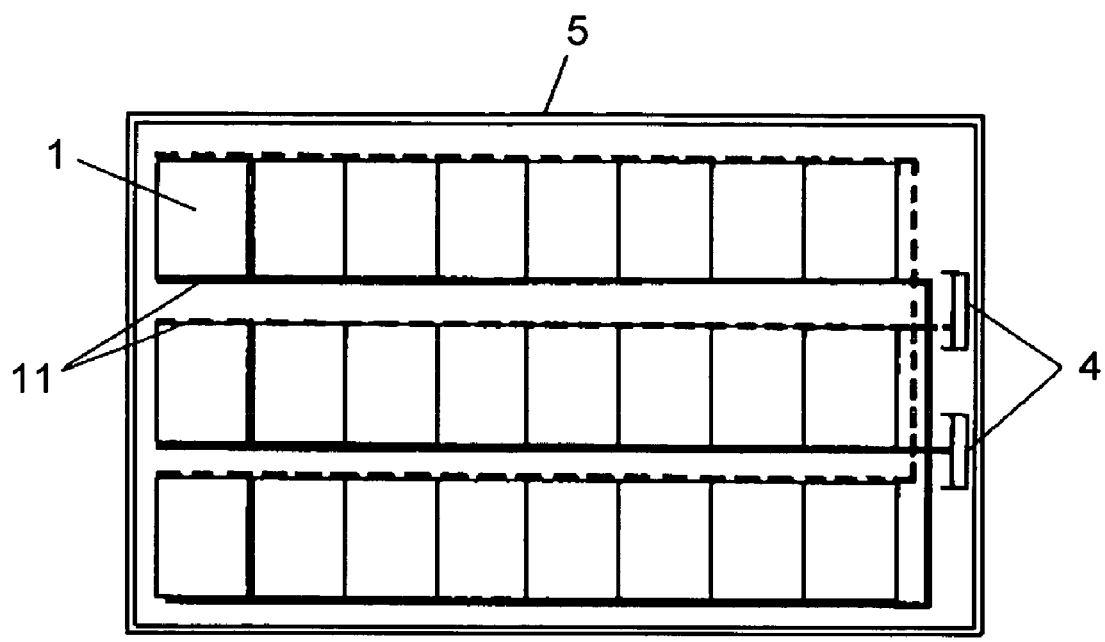
FIG. 7A shows a top view of the metallized film capacitor used for a comparative example.
Figure 7B:
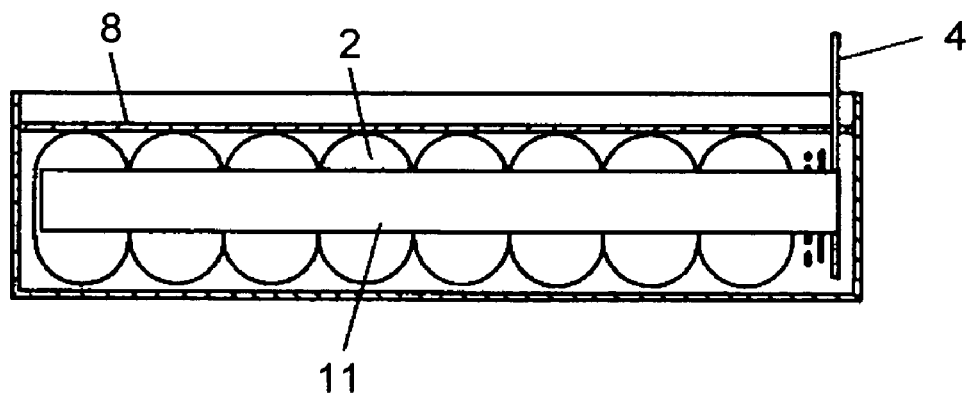
FIG. 7B shows a sectional side view of the metallized film capacitor used for a comparative example.

The comparative example is described with reference to FIGS. 7A and 7B. In the comparative example, flattened capacitor elements 1 are arranged such that metallized contact electrodes 2 face perpendicularly to the bottom surface of case 5. Six pieces of bus-bars 11 connect metallized contact electrodes 2 as shown in dotted lines and solid lines in FIG. 7A. The metallized film capacitor is completed after connecting two pieces of bus-bars additionally as electrode terminals 4.

The number of bus-bars used in the comparative example amounts to 8 pieces totally. Costs of bus-bars doubles compared with exemplary embodiments 1 to 5 that use only two pieces of bus-bars, and yet the amount of capacitance is only 1200 µF. Moreover, the amount of capacitance per unit volume becomes smaller compared with exemplary embodiment 2 to 4 due to an adequate clearance between opposite polarities of bus-bars 11.

Table 1 lists capacitance per unit volume (µF/cm$^3$), inductance (nH) and rate-of-change of capacitance (%) of the metallized film capacitor used in the comparative example. The definition of the rate-of-change of capacitance is the same as for exemplary embodiment 1.

TABLE 1

| Exemplary embodiment | Capacitance per unit volume (µF/cm$^3$) | Inductance (nH) | Rate-of-change of capacitance (%) |
|---|---|---|---|
| 1 | 1.11 | 25.6 | −4.9 |
| 2 | 0.972 | 23.5 | −2.0 |
| 3 | 0.974 | 25.1 | −2.3 |
| 4 | 1.04 | 23.2 | −2.2 |
| 5 | 1.29 | 19.5 | −3.5 |
| Comparative | 0.833 | 42.3 | −9.8 |

The comparative example has a longer wiring distance compared with exemplary embodiment 1 to 5 due to extended length of bus-bars 11, causing an increase in inductance.

The comparative example has a larger rate-of-change of capacitance compared with exemplary embodiment 2 to 5, as copper-made bus-bar 3a to prevent moisture ingress is not provided on the resin surface of the opening. The copper-made bus-bars 3 of exemplary embodiment 1 is not so large as enable to cover the opening compared with exemplary embodiment 2 to 5, causing an increase in rate-of-change of capacitance.

As mentioned above, forming a plate-like bus-bar 3 so as to cover the opening of the case can improve moisture resistance of the metallized film capacitor.

INDUSTRIAL APPLICABILITY

The present invention can provide a metallized film capacitor with a structure easy for downsizing, with increasing in capacitance and a reduced cost and a strong moisture resistance. The metallized film capacitor can operate in electronic, electrical and industrial equipment under possible hot and humid environments.

The invention claimed is:

1. A metallized film capacitor comprising:
a plurality of capacitor elements composed of rolled up or multi-layered metallized films and provided with electrodes on both ends in the width direction;
an electrical conductor to connect each of the electrodes of each end of a plurality of the capacitor elements; and
a capacitor case to house a plurality of the capacitor elements,
wherein a plurality of the capacitor elements are arranged facing a same direction in the capacitor case, placing each of the electrodes of each end generally coplanarly, and further using a resin as a sealant to house a plurality of the capacitor elements into the capacitor case;
wherein each capacitor element is formed flattened,
the capacitor case forms a rectangular solid having an opening surface and a bottom surface facing the opening surface,
the capacitor elements are arranged such that one of the electrodes faces the opening surface and another of the electrodes faces the bottom surface respectively and are aligned in a plurality of lines toward a same direction; and
a plurality of the capacitor elements are arranged in a zigzag formation toward a same direction.

2. The metallized film capacitor of claim 1,
wherein the electrical conductors to connect each of the electrodes have a plate-like form and integrated with electrode terminals, and portions to be the electrode terminal protrudes externally from the capacitor case.

3. The metallized film capacitor of claim 1,
wherein the capacitor case formed a rectangular solid has an opening surface and a bottom surface facing the opening surface; and
the capacitor elements are arranged such that one of the electrodes face the opening surface and another of the electrodes face the bottom surface respectively and are aligned toward a same direction.

4. The metallized film capacitor of claim 1,
wherein each capacitor element has a form of a generally rectangular solid of multi-layered capacitor by cutting to remove both side corner portions of the flattened capacitor element perpendicularly to the electrode.

5. The metallized film capacitor of claim 1,
wherein the electrical conductor to connect the electrodes facing the opening surface of the capacitor case is formed plate-like so as to cover the opening.

6. A metallized film capacitor comprising:
a plurality of capacitor elements composed of rolled up or multi-layered metallized films and provided with electrodes on both ends in the width direction;
an electrical conductor to connect each of the electrodes of each end of a plurality of the capacitor elements; and
a capacitor case to house a plurality of the capacitor elements,
wherein the capacitor case houses, using a resin as a sealant, a plurality of the capacitor elements having different widths of the metallized film and each of the electrodes of each of the capacitor elements is connected in parallel so as to be sandwiched between two pieces of bent electrical conductors,
wherein each capacitor element is formed flattened,
the capacitor case forms a rectangular solid having an opening surface and a bottom surface facing the opening surface,
the capacitor elements are arranged such that one of the electrodes faces the opening surface and another of the electrodes faces the bottom surface respectively and are aligned in a plurality of lines toward a same direction; and
a plurality of the capacitor elements are arranged in a zigzag formation toward a same direction.

7. The metallized film capacitor of claim 6,
wherein the electrical conductors to connect each of the electrodes have a plate-like form and integrated with electrode terminals, and portions to be the electrode terminal protrudes externally from the capacitor case.

8. The metallized film capacitor of claim 6, wherein
the capacitor case formed a rectangular solid has an opening surface and a bottom surface facing the opening surface; and
the capacitor elements are arranged such that one of the electrodes face the opening surface and another of the electrodes face the bottom surface respectively and are aligned toward a same direction.

9. The metallized film capacitor of claim 6,
wherein each capacitor element has a form of a generally rectangular solid of multi-layered capacitor by cutting to remove both side corner portions of the flattened capacitor element perpendicularly to the electrode.

10. The metallized film capacitor of claim 6,
wherein the electrical conductor to connect the electrodes facing the opening surface of the capacitor case is formed plate-like so as to cover the opening.

* * * * *